United States Patent
Fujimura

(10) Patent No.: US 10,472,969 B2
(45) Date of Patent: Nov. 12, 2019

(54) COOLING STRUCTURE FOR TURBINE, AND GAS TURBINE

(71) Applicant: MITSUBISHI HEAVY INDUSTRIES, LTD., Tokyo (JP)

(72) Inventor: Daigo Fujimura, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 261 days.

(21) Appl. No.: 15/524,486

(22) PCT Filed: Sep. 7, 2015

(86) PCT No.: PCT/JP2015/075323
§ 371 (c)(1),
(2) Date: May 4, 2017

(87) PCT Pub. No.: WO2016/076003
PCT Pub. Date: May 19, 2016

(65) Prior Publication Data
US 2017/0321555 A1 Nov. 9, 2017

(30) Foreign Application Priority Data

Nov. 12, 2014 (JP) .................................. 2014-229595

(51) Int. Cl.
| | | |
|---|---|---|
| *F01D 5/08* | (2006.01) | |
| *F01D 25/12* | (2006.01) | |
| *F02C 7/18* | (2006.01) | |

(52) U.S. Cl.
CPC ............ *F01D 5/087* (2013.01); *F01D 5/081* (2013.01); *F01D 25/12* (2013.01); *F02C 7/18* (2013.01);
(Continued)

(58) Field of Classification Search
None
See application file for complete search history.

(56) References Cited

U.S. PATENT DOCUMENTS 3,936,222 A * 2/1976 Asplund ............... F01D 5/3015
   416/95
4,439,107 A * 3/1984 Antonellis ............. F01D 5/081
   415/115
(Continued)

FOREIGN PATENT DOCUMENTS

| JP | 8-14064 | 1/1996 |
|---|---|---|
| JP | 2000-297607 | 10/2000 |

(Continued)

OTHER PUBLICATIONS

Notification of Reason for Refusal dated Mar. 28, 2018 in corresponding Korean Patent Application No. 10-2017-7009669, with English translation.

(Continued)

Primary Examiner — Michael Lebentritt
(74) *Attorney, Agent, or Firm* — Wenderoth, Lind & Ponack, L.L.P.

(57) ABSTRACT

A cooling structure for a turbine includes a plurality of disks configured to rotate integrally with blades, the disks being arranged along a rotational axis; and the disks have disk holes defined therein and arranged in a circumferential direction for supplying cooling air for cooling the blades to downstream disks. At least one of the disk holes is set such that, when a rotational direction of the disk is defined as a positive direction and a direction opposite the rotational direction is defined as a negative direction, an outlet absolute circumferential velocity vector which is a component in the rotational direction of a velocity vector of the cooling air at an outlet of the disk hole is smaller than an inlet absolute circumferential velocity vector which is a component in the rotational direction of a velocity vector of the cooling air at an inlet of the disk hole.

10 Claims, 9 Drawing Sheets

(52) U.S. Cl.
CPC ...... *F05D 2220/32* (2013.01); *F05D 2240/81* (2013.01); *F05D 2260/20* (2013.01); *F05D 2260/601* (2013.01); *Y02T 50/676* (2013.01)

(56) References Cited

U.S. PATENT DOCUMENTS

| | | | |
|---|---|---|---|
| 7,624,580 B2 | 12/2009 | Fukutani | |
| 2003/0223893 A1* | 12/2003 | Coulon | F01D 5/081 417/423.1 |
| 2004/0046326 A1 | 3/2004 | Yuri et al. | |
| 2007/0271930 A1 | 11/2007 | Takaoka et al. | |
| 2010/0061853 A1* | 3/2010 | Bagepalli | H02K 7/1823 416/95 |
| 2014/0178198 A1* | 6/2014 | Bluck | F01D 5/187 416/1 |
| 2014/0271150 A1* | 9/2014 | Pouzet | F01D 5/081 415/174.5 |
| 2017/0152747 A1* | 6/2017 | Kim | F01D 5/081 |
| 2018/0010461 A1* | 1/2018 | Kim | F01D 5/081 |
| 2018/0245474 A1* | 8/2018 | Alexander | F01D 5/087 |

FOREIGN PATENT DOCUMENTS

| | | |
|---|---|---|
| JP | 2006-125348 | 5/2006 |
| JP | 2007-298020 | 11/2007 |
| JP | 4146257 | 9/2008 |
| JP | 2011-21542 | 2/2011 |
| JP | 4675638 | 4/2011 |

OTHER PUBLICATIONS

Office Action dated Jul. 10, 2018 in corresponding Chinese Application No. 201580055342.6, with English translation.
Office Action dated Sep. 4, 2018 in corresponding Japanese Application No. 2014-229595, with English translation.
International Search Report dated Dec. 8, 2015 in corresponding International Application No. PCT/JP2015/075323.
International Preliminary Report on Patentability dated May 16, 2017 in corresponding International Application No. PCT/JP2015/075323.
Office Action dated Mar. 29, 2019 in Chinese Patent Application No. 201580055342.6 (with Machine Translation).

* cited by examiner

COOLING STRUCTURE FOR TURBINE, AND GAS TURBINE

TECHNICAL FIELD

The present invention relates to a cooling structure for a turbine and to a gas turbine using the cooling structure. In the cooling structure, disks that rotate integrally with blades, such as seal disks or rotor disks, are disposed in a plurality of stages along a rotational axis. At the same time, disk holes, which supply cooling air for cooling the blades to disks on the downstream side, are formed in the disks.

BACKGROUND ART

In the gas turbine, compressed air from a compressor is fed into a combustor, and high temperature gas generated by combusting fuel with the compressed air is fed into a turbine portion, thus driving the turbine portion. Vanes and blades are provided alternatingly along the rotational axis of the turbine portion in a plurality of stages. Some of the compressed air is extracted and the extracted compressed air is fed into the vanes and blades of the turbine portion as cooling air.

To further describe the cooling of the blades, a plurality of disk holes are formed in a rotor disk, to which the blades are attached, at intervals on a circumference of the rotor disk about the rotational axis (at equal angle intervals, for example; however, there are cases in which they are not at equal angle intervals). The extracted air that has been cooled by passing through a cooler is used as the cooling air (or the extracted air is used as the cooling air as it is, without using the cooler). The cooling air is caused to pass through the disk holes, thus supplying the cooling air to each of the rotor disks provided in the plurality of stages along the rotational axis. The cooling air supplied to the rotor disks is fed into the interior of the blades through flow channels inside the rotor disks, and cools the blades from the inside.

As technology to cool the blades, a technology is proposed that supplies the cooling air to the disk holes of the rotor via a so-called Tangential On Board Injection (TOBI) nozzle (see Japanese Patent No. 4146257B). The TOBI nozzle is to supply the cooling air to the disk holes as a circulating flow along the rotational direction of the rotor, and as a result, pumping loss can be reduced.

Specifically, if the cooling air that does not have a flow velocity component in the rotational direction of the disk is supplied to the disk holes, when the cooling air flows into the interior of the disk, energy loss (pumping loss) occurs, leading to reduced performance of the gas turbine. Here, by imparting the flow velocity component in the rotational direction of the rotor to the cooling air and thus generating the circulating flow, a difference between the flow velocity component in the rotational direction of the cooling air and a rotational speed of the rotor is made small, and the occurrence of pumping loss is suppressed.

However, in the above-described technology, some of the compressed air supplied as combustion air to the combustor is extracted, and the extracted compressed air is used as the cooling air. Therefore, the amount of the compressed air supplied to the combustor and a combustion amount of the combustor is reduced by an amount corresponding to the air extracted as the cooling air, and the turbine output thus deteriorates. Further, when the extracted air is passed through the cooler and cooled before being used as the cooling air, power to perform the cooling by the cooler is required, and this results in energy loss.

When the TOBI nozzle is used, pumping loss can be suppressed and the turbine output can be improved. However, it is desirable to further improve the turbine output.

SUMMARY OF INVENTION

In light of the foregoing, an object of the present invention is to provide a cooling structure for a turbine and a gas turbine that are capable of increasing a turbine output.

Solution to Problem (1) In order to achieve the above-described object, a cooling structure for a turbine of the present invention is configured such that disks rotating integrally with blades about a rotational axis in a predetermined rotational direction are disposed in a plurality of stages along the rotational axis, and the disks have formed therein disk holes arranged in a plurality along a circumferential direction that supply cooling air for cooling the blades to disks on a downstream side. At least one of the disks is a motive power recovery type disk in which at least one of the disk holes is set such that an outlet absolute circumferential velocity vector, which is a component in the rotational direction of a velocity vector of the cooling air at an outlet of the disk hole, is smaller than an inlet absolute circumferential velocity vector, which is a component in the rotational direction of a velocity vector of the cooling air at an inlet of the disk hole, wherein the rotational direction of the disk is defined as a positive direction and the direction opposite the rotational direction is defined as a negative direction.

(2) With respect to the disk hole of the motive power recovery type disk, it is preferable that the outlet of the cooling air be disposed further to an upstream side, in the rotational direction, than the inlet of the cooling air.

(3) In a cross section cut along the circumferential direction, it is preferable that the disk hole of the motive power recovery type disk have an airfoil shape that curves in the opposite direction to the rotational direction of the motive power recovery type disk toward a downstream side in a flow direction of the cooling air.

(4) It is preferable that the disk hole of the motive power recovery type disk be narrowed on the downstream side in the flow direction of the cooling air.

(5) In a cross section cut along the circumferential direction, it is preferable that the disk hole of the motive power recovery type disk be formed such that wall surfaces defining the disk hole are straight lines.

(6) It is preferable that a TOBI nozzle be provided that forms a circulating flow of cooling air rotating in the same direction as the rotational direction of the motive power recovery type disk, the cooling air being supplied from the TOBI nozzle to the motive power recovery type disk.

(7) It is preferable that the TOBI nozzle be provided in at least one of spaces between the plurality of disks.

(8) At least one of the disks, from among the disks from the second disk onward from the upstream side in the flow direction of the cooling air, may be configured as the motive power recovery type disk, and the cooling air may be supplied directly to the motive power recovery type disk from the disk disposed further to the upstream side in the flow direction of the cooling air than the motive power recovery type disk.

(9) In this case, it is preferable that, by setting inclination angles of the disk hole in the motive power recovery type disk and the disk hole in the disk disposed further to the upstream side in the flow direction of the cooling air than the motive power recovery type disk to be different angles, the outlet absolute circumferential velocity vector be caused to be smaller than the inlet absolute circumferential velocity vector in the motive power recovery type disk.

(10) Alternatively, it is preferable that, by setting a distance of the disk hole from the axis of rotation to be a different distance for the motive power recovery type disk and for the disk disposed further to the upstream side in the flow direction of the cooling air than the motive power recovery type disk, the outlet absolute circumferential velocity vector be caused to be smaller than the inlet absolute circumferential velocity vector in the motive power recovery type disk.

(11) In order to achieve the above-described object, a gas turbine of the present invention includes: a compressor portion configured to take in and compress air; a combustion portion configured to generate combustion gas by combusting a fuel-air mixture formed from compressed air and a fuel supplied from outside; and a turbine portion configured to extract a rotational driving force from the generated combustion gas. The turbine portion is provided with the cooling structure for the turbine.

Advantageous Effects of Invention

According to the present invention, an amount by which an outlet absolute circumferential velocity vector of cooling air at an outlet of a disk hole is smaller than an inlet absolute circumferential velocity vector of the cooling air at an inlet of the disk hole is recovered as motive power (motive power energy) that drives a rotor disk, and as a result, the circulation of the cooling air can be used to increase a turbine output.

In addition, at the time of this recovery, the cooling air works and a temperature thereof decreases. Thus, an amount of the cooling air can be reduced by an amount corresponding to the decrease in temperature, and turbine efficiency can be improved.

DESCRIPTION OF EMBODIMENTS

Embodiments of the present invention are to be described with reference to the drawings below. Note that the embodiments illustrated below are simply examples, and do not intend to exclude various modifications and technological applications not described in the following embodiments. Various modifications can be made to structures of the following embodiments, insofar as they do not depart from the scope and spirit of the embodiments.

1 First Embodiment

A gas turbine and a cooling structure for a turbine according to a first embodiment of the present invention are to be described with reference to FIGS. 1 to 3.

1-1 Configuration of Gas Turbine

Figure 1:
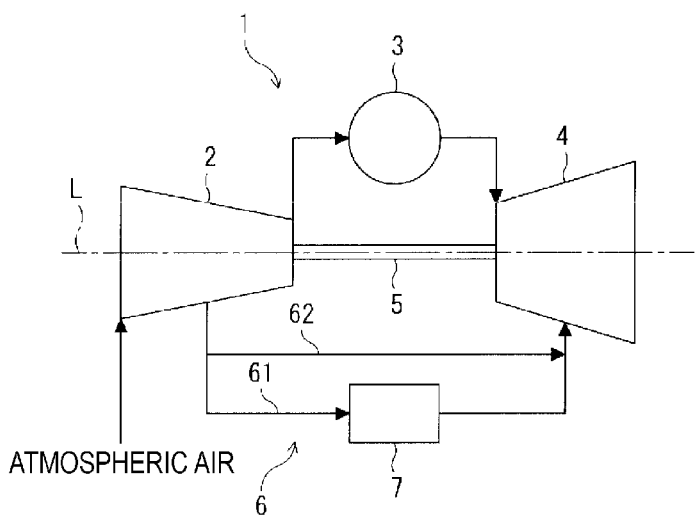
FIG. 1 is a schematic view illustrating an overall structure of a gas turbine according to first to fourth embodiments of the present invention.

As illustrated in FIG. 1, a gas turbine 1 of the present embodiment is, for example, used to drive machinery such as a power generator (not illustrated), and is provided with a compressor (a compressor portion) 2, a combustor (a combustion portion) 3, a turbine portion (a turbine) 4, a rotating shaft 5, and a cooling supply line 6 for supplying cooling air to the turbine portion 4.

The compressor 2 takes in and compresses atmospheric air, which is outside air, and supplies the compressed air to the combustor 3. The combustor 3 generates high temperature gas (combustion gas) by mixing the air compressed by the compressor 2 with fuel supplied from outside, and combusting the fuel-air mixture. The rotating shaft 5 is a circular column shaped member that is rotatably supported about a rotational axis (axis line) L. The rotating shaft 5 transmits a rotational driving force generated by the turbine portion 4 to the compressor 2 and the machinery such as the power generator.

Note that, hereinafter, the circumferential direction, the radial direction, an inner circumferential side, and an outer circumferential side with respect to the rotational axis L as a center are simply referred to as the circumferential direction, the radial direction, the inner circumferential side, and the outer circumferential side.

The turbine portion 4 generates the rotational driving force by receiving the supply of the high temperature gas generated by the combustor 3, and transmits the generated rotational driving force to the rotating shaft 5.

The cooling supply line 6, which is provided for cooling the turbine portion 4, extracts some of the compressed air from the compressor 2 and supplies the extracted air to the blades of the turbine portion 4 as cooling air. The cooling supply line 6 is provided with a line 61 that supplies the above-described extracted air, which is cooled by a cooler 7, to the turbine portion 4 as the cooling air, and a line 62 that causes the above-described extracted air to bypass the cooler 7 and supplies this extracted air to the turbine portion 4. Note that the cooling supply line 6 may be constituted by only one of either the line 61 provided with the cooler 7 or the line 62 that is not provided with the cooler 7.

1-2 Configuration of Turbine Portion and Cooling Structure Thereof

The turbine portion 4 and the cooling structure thereof are to be described with reference to FIG. 2.

In the turbine portion 4, first stage vanes 20, first stage blades 30, second stage vanes 40, and second stage blades 50 are installed, in that order, from an upstream side in a flow direction of a combustion gas G in a flow path (hereinafter also referred to as a gas flow path) of the combustion gas G generated from the combustor 3 (see FIG. 1). Specifically, the vanes and the blades are alternatingly installed in a plurality along the gas flow path.

Note that the first stage vanes 20 are the vanes closest to the combustor 3, and the first stage blades 30 are the blades closest to the combustor 3. FIG. 2 is a diagram illustrating a part of the turbine portion 4, and only the vanes and blades 20 to 50 disposed in the vicinity of the combustor 3 are illustrated. However, the vanes and blades are also alternatingly disposed along the flow path of the combustion gas G further to the downstream side in the flow direction (hereinafter also referred to as later stages) than the vanes and blades 20 to 50.

Each of the vanes 20 and 40 are vanes provided so as to hang down from the inner circumferential side of a casing 10 formed in a cylindrical shape about the rotational axis L, and are disposed side by side at equal intervals in the circumferential direction inside the gas flow path.

An inner shroud 21 is provided on an end portion on the inner circumferential side of each of the first stage vanes 20. The inner shroud 21 is a planar member that extends in the circumferential direction, and forms a part of the gas flow path. Here, the inner shroud 21 is configured as a single member that is not divided, and is fixed to a shell portion 22. A cavity (not illustrated), through which the cooling air is supplied, is formed in the interior of the shell portion 22. However, the inner shroud 21 may be constituted by a plurality of members divided in the circumferential direction, and a fixing method is not limited to the above-described mode (being fixed to the shell portion 22).

Further, a cooling flow path 23 that is in communication with and connected to the above-described cavity, through which the cooling air is supplied, is provided in the shell portion 22, and a Tangential On Board Injection (TOBI) nozzle 24, which is to be described later, is installed in an outlet of the cooling flow path 23.

An inner shroud 41 is provided on an end portion on the inner circumferential side of each of the second stage vanes 40. Similar to the inner shroud 21, the inner shroud 41 is a planar member that extends in the circumferential direction, and forms a part of the gas flow path. A hub 43 is attached to the inner circumferential side of the inner shroud 41, via support members 42 disposed side by side at equal intervals in the circumferential direction. Here, the inner shroud 41 is configured as a single member that is not divided, but may be constituted by a plurality of members divided in the circumferential direction. Further, the plurality of support members 42 that support the hub 43 may not be arranged at equal intervals, and the method of supporting the hub 43 is not limited to the above-described mode.

The hub 43 is configured as a two-layer annular member having an annular space in an interior thereof. Specifically, the hub 43 is constituted by a planar outer circumferential side annular member 43a extending in the circumferential direction, and a planar inner circumferential side annular member 43b extending in the circumferential direction, which are disposed on the same axis (the rotational axis L) spaced apart in the radial direction. A TOBI nozzle 44 that is to be described later is installed in the annular space between the outer circumferential side annular member 43a and the inner circumferential side annular member 43b.

Here, the outer circumferential side annular member 43a and the inner circumferential side annular member 43b are each configured as a single member that is not divided, but each may be constituted by a plurality of members divided in the circumferential direction.

The first stage blades 30 are blades provided so as to stand up on the outer circumferential surface of a first stage rotor disk 31 formed in a disk shape, and the first stage blades 30 are disposed side by side at equal intervals in the circumferential direction inside the gas flow path. The first stage blades 30 are attached to the first stage rotor disk 31 via a platform 34 and blade roots (not illustrated). The platform 34 extends in the circumferential direction and forms part of a gas flow channel.

The first stage rotor disk 31 is a disk-like member having the rotational axis L as its center, and is attached to the rotating shaft 5 (see FIG. 1) so as to be capable of transmitting a rotational driving force. The first stage rotor disk 31 is driven to rotate by the first stage blades 30 receiving the combustion gas G and the rotating shaft 5 is thus driven to rotate.

Disk holes 32 and cooling flow channels 33 are formed in the first stage rotor disk 31.

The disk holes 32 are formed to penetrate through the first stage rotor disk 31 in the direction of the rotational axis L, and are disposed in a plurality at equal intervals in the circumferential direction, at the same position in the radial direction. The position in the radial direction of each of the disk holes 32 is set to be the same position in the radial direction as the TOBI nozzles 24 and 44, and each of the disk holes 32 forms a flow channel for supplying part of the cooling air discharged from the TOBI nozzle 24 to the second stage blades 50 disposed further to the downstream side (hereinafter also referred to as the later stage) than the first stage blades 30. Note that the plurality of disk holes 32 may not be disposed in the same position in the radial direction, may not be disposed at equal intervals, and further, may not be disposed at the same position as the TOBI nozzles 24 and 44 in the radial direction.

Each of the cooling flow channels 33 penetrates through the interior of the first stage rotor disk 31, the blade root, and the platform 34, and is a flow channel that feeds some of the cooling air discharged from the TOBI nozzle 24 to the interior of each of the first stage blades 30, as illustrated by an arrow a1. The cooling flow channels 33 are arranged in a plurality at equal intervals in the circumferential direction, and each of the flow channels 33 is disposed at the same position in the circumferential direction as each of the first stage blades 30. Note that the cooling flow channels 33 may not be disposed at equal intervals, and may not be disposed at the same position in the circumferential direction as the first stage blades 30 (need not be disposed corresponding to each one of the first stage blades 30). Further, a number of the cooling flow channels 33 provided may be different from a number of the first stage blades 30.

The second stage blades 50 and a second stage rotor disk 51 are configured in a similar manner to the first stage blades 30 and the first stage rotor disk 31.

Specifically, the second stage blades 50 are blades provided so as to stand up on the outer circumferential surface of the disk-shaped second stage rotor disk 51, are disposed side by side at equal intervals in the circumferential direction inside the gas flow path, and are attached to the second stage rotor disk 51 via a platform 54 that extends in the circumferential direction and blade roots (not illustrated).

The second stage rotor disk 51 is a disk-like member having the rotational axis L as its center, and is attached to the rotating shaft 5 so as to be capable of transmitting a rotational driving force. Disk holes 52 and cooling flow channels 53 are formed in the second stage rotor disk 51.

The disk holes 52 are formed to penetrate through the second stage rotor disk 51 in the direction of the rotational axis L, and are disposed in a plurality at equal intervals in the circumferential direction, at the same position in the radial direction. The position in the radial direction of each of the disk holes 52 is set to be the same position in the radial direction as the TOBI nozzle 44, and each of the disk holes 52 forms a flow channel that supplies part of the cooling air discharged from the TOBI nozzle 44 to blades (not illustrated) further to the downstream side. Note that the plurality of disk holes 52 may not be disposed in the same position in the radial direction, may not be disposed at equal intervals, and further, may not be disposed at the same position as the TOBI nozzle 44 in the radial direction.

Each of the cooling flow channels 53 penetrates through the interior of the second stage rotor disk 51, the blade root, and the platform 54, and is a flow channel that feeds some of the cooling air discharged from the TOBI nozzle 44 to the interior of the second stage blade 50, as illustrated by an arrow a2. Each of the cooling flow channels 53 is disposed in the same position in the circumferential direction as each of the second stage blades 50. The cooling flow channels 53 may not be disposed at equal intervals, and may not be disposed at the same position in the circumferential direction as the second stage blades 50 (need not be disposed for each of the second stage blades 50). Further, a number of the cooling flow channels 53 provided may be different than a number of the second stage blades 50.

Note that a seal member 35 attached to the rotor disk 31 and seal members 55 and 56 attached to the rotor disk 51 are members provided between the inner circumferential side annular member 43b attached to the vanes 40 and an inner circumferential side annular member attached the vanes (not illustrated) of the later stage, with small gaps therebetween, and are sealing members for inhibiting leakage of the cooling air.

The TOBI nozzles 24 and 44, and the disk holes 32 and 52 are to be described in more detail. The TOBI nozzle 24 and the TOBI nozzle 44 have substantially the same configuration, and the disk holes 32 and the disk holes 52 have substantially the same configuration. Thus, the TOBI nozzle 24 and the disk holes 32 are taken as examples, and the description are to be given with reference to FIGS. 2 and 3. Note that FIG. 3 is a schematic cross-sectional view cut along the circumferential direction of the TOBI nozzle 24 and the rotor disk 31 (note that only a part thereof is illustrated), and is a diagram to which a velocity vector of the cooling air and a rotational velocity vector of the rotor disk 31 are illustrated.

The TOBI nozzle 24 imparts, to the cooling air flowing through the cooling flow path 23, a circulating flow component in the same direction as a rotational direction of the rotor disk 31 (hereinafter also referred to as a disk rotational direction) U.

To describe this specifically, the TOBI nozzle 24 is provided with an outer ring portion 24a that is formed in an annular shape with the rotational axis L as its center, an inner ring member 24b that is formed in an annular shape with the rotational axis L as its center and that is disposed on the inside in the radial direction spaced apart from the outer ring member 24a (see FIG. 2), and a plurality of airfoil portions 24c arranged at equal intervals and disposed between the outer ring portion 24a and the inner ring portion 25b. The outer ring portion 24a and the inner ring portion 24b are fixed integrally with each other via the airfoil portions 24c.

Then, nozzle portions 24d are formed between the airfoil portions 24c adjacent to each other in the circumferential direction. As illustrated in FIG. 3, a cross-sectional shape of each of the nozzle portions 24d when cut along the circumferential direction is a shape that gradually inclines to the disk rotational direction U side in a flow direction A1 of the cooling air, and a flow channel width thereof becomes gradually smaller. This cross-sectional shape has a constant cross-sectional shape with respect to the radial direction (the vertical direction on the paper surface in FIG. 3). Specifically, the nozzle portion 24d is formed so as to have a curved shape in which it is oriented toward the disk rotational direction U and a narrowing shape in which a flow channel cross-sectional area thereof becomes smaller the further to the downstream side in the above-described flow direction A1.

Due to the configuration of the TOBI nozzle 24 having this type of configuration, the cooling air is accelerated and is discharged from the TOBI nozzle 24 as a circulating flow that circulates in the disk rotational direction U.

Figure 3:
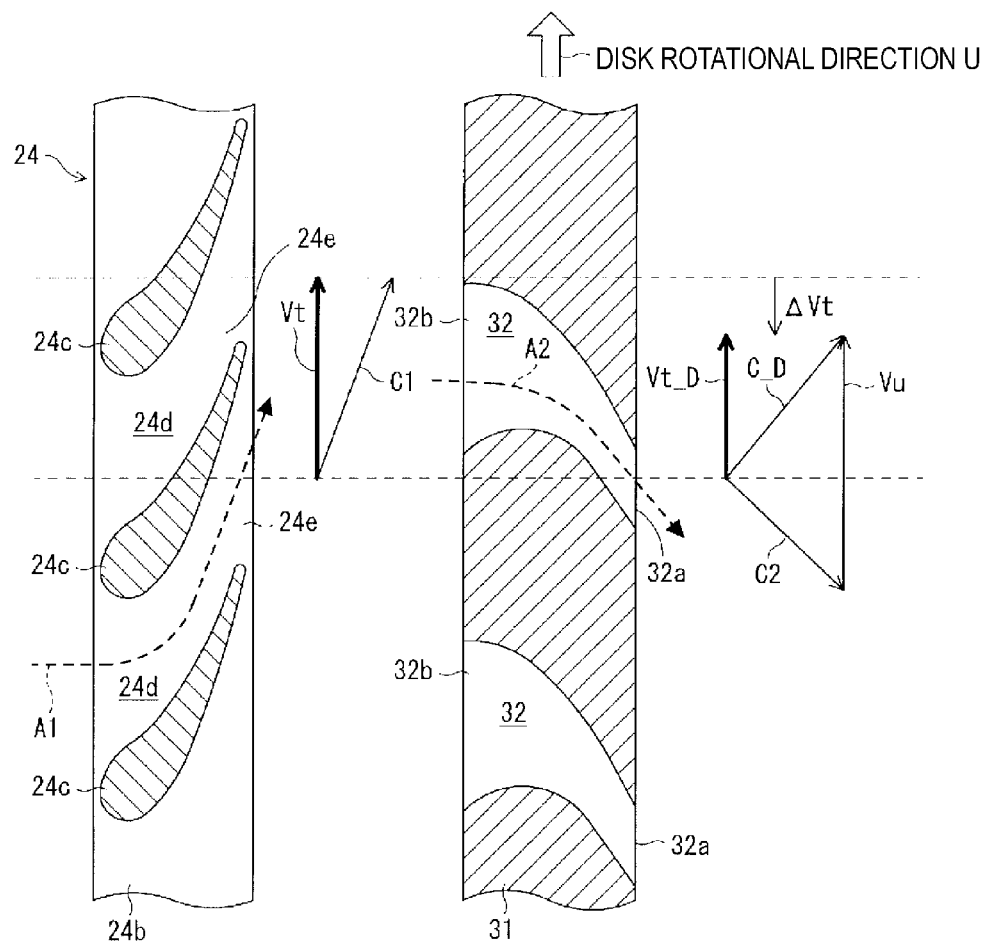
FIG. 3 is a schematic view illustrating a structure of a TOBI nozzle and disk holes according to the first embodiment of the present invention, and is a diagram in which a velocity vector of cooling air and a rotational velocity vector of a rotor disk are illustrated in a cross-sectional view of the TOBI nozzle and the rotor disk cut along the circumferential direction.

Further, as illustrated in FIG. 3, a cross-sectional shape of each of the disk holes 32, when cut along the circumferential direction thereof, has a shape following substantially along a direction orthogonal to the disk rotational direction U at an inlet portion (an upstream portion of a flow direction A2 of the cooling air), but has a shape that inclines gradually in an opposite direction to the disk rotational direction U the closer to an outlet portion (a downstream portion of the flow direction A2 of the cooling air). This cross-sectional shape has a constant cross-sectional shape with respect to the radial direction (the vertical direction on the paper surface in FIG. 3). Specifically, each of the disk holes 32 is formed so as to have an airfoil shape with a reverse orientation to that of each of the nozzle portions 24d of the TOBI nozzle 24, and has a curved shape oriented toward the opposite direction to the disk rotational direction U and a narrowing shape in which a flow channel cross-sectional area thereof becomes narrower the further to the downstream side in the above-described flow direction A2.

Here, with reference to FIG. 3 and taking the TOBI nozzle 24 and the disk hole 32 as an example, as a significant feature of the present invention, a method is to be described for setting a flow channel cross-sectional area and a discharge angle at a cooling air outlet (hereinafter also referred to as a nozzle outlet) 24e of the nozzle portion 24d of the TOBI nozzle 24, and a flow channel cross-sectional area and a discharge angle of a cooling air outlet (hereinafter also referred to as a hole outlet) 32a of the disk hole 32.

In FIG. 3, reference sign C1 indicates a velocity vector of the cooling air at the nozzle outlet 24e (in other words, a velocity vector of the cooling air at a cooling air inlet (hereinafter also referred to as a hole inlet) 32b of the disk hole 32), and reference sign C2 indicates a velocity vector of the cooling air at the hole outlet 32a.

The velocity vector C1 of the nozzle outlet 24e is a velocity vector calculated on the basis of a volume flow per unit time of the cooling air flowing into the nozzle portion 24d, and the flow channel cross-sectional area and a discharge angle at the nozzle outlet 24e.

Since the shell portion 22 in which the TOBI nozzle 24 is provided (namely in which the nozzle outlet 24e is disposed) is in a stationary state, the velocity vector C1 is an absolute velocity vector, and a component in the disk rotational direction U of this absolute velocity vector C1 is an absolute circumferential velocity vector Vt at the nozzle outlet 24e (namely, an inlet absolute circumferential velocity vector at the hole inlet 32b, hereinafter also referred to as an inlet absolute circumferential velocity vector).

The velocity vector C2 of the hole outlet 32a is a velocity vector calculated on the basis of a volume flow per unit time of the cooling air flowing into the disk hole 32, and a flow channel cross-sectional area and a discharge angle at the hole outlet 32a, and is a relative velocity vector using the rotor disk 31 as a reference. As illustrated in FIG. 3, an absolute velocity vector C_D of the cooling air at the hole outlet 32a is obtained by combining the relative velocity vector C2 and a circumferential velocity vector Vu of the rotor disk 31 at the hole outlet 32a, and the component in the disk rotational direction U of the absolute velocity vector C_D is an absolute circumferential velocity vector (hereinafter also referred to as an outlet absolute circumferential velocity vector) Vt_D of the cooling air at the hole outlet 32a.

Further, when the disk rotational direction U is defined as the positive direction (the plus direction), the flow channel cross-sectional area and the discharge angle at the nozzle outlet 24e, and also the flow channel cross-sectional area and the discharge angle at the hole outlet 32a are set such that the absolute circumferential velocity vector Vt_D of the cooling air at the hole outlet 32a is smaller than the absolute circumferential velocity vector Vt of the cooling air at the nozzle outlet 24e.

The absolute circumferential velocity vector Vt of the cooling air at the nozzle outlet 24e is the inlet absolute circumferential velocity vector of the cooling air flowing into the hole inlet 32, as described above. In the course of the cooling air passing through the disk hole 32 as illustrated by an arrow A2, a difference $\Delta Vt$ ($=Vt-Vt\_D$) between the inlet absolute circumferential velocity vector Vt and the outlet absolute circumferential velocity vector Vt_D is recovered as motive power (motive power energy) that acts to assist drive the rotor disk 31, which is driven by the combustion gas G, in the disk rotational direction U. Specifically, the rotor disk 31 is configured as a motive power recovery type disk.

Here, "absolute" with respect to the inlet absolute circumferential velocity vector Vt and the outlet absolute circumferential velocity vector Vt_D refers to the fact that these are circumferential velocity vectors of an absolute system that takes a fixed system as reference and are not relative circumferential velocity vectors that take the rotor disk 31 as reference, and does not refer to absolute values (magnitudes). To explain further, the fact that the outlet absolute circumferential velocity vector Vt_D is smaller than the inlet absolute circumferential velocity vector Vt does not express a comparison of scalar amounts of the magnitude (absolute values) of both absolute circumferential velocity vectors Vt and Vt_D, but refers to a comparison of vector quantities when the disk rotational direction U is defined as the positive direction (the plus direction) and the opposite direction to the disk rotational direction U is defined as the negative direction (the minus direction). Thus, if, for example, the direction of the inlet absolute circumferential velocity vector Vt is the same direction (the plus direction) as the disk rotational direction U and the direction of the outlet absolute circumferential velocity vector Vt_D is the opposite direction (the minus direction) to the disk rotational direction U, regardless of the magnitudes (absolute values) of the absolute circumferential velocity vectors Vt and Vt_D, the outlet absolute circumferential velocity vector Vt_D is smaller than the inlet absolute circumferential velocity vector Vt.

Further, in a similar manner, the flow channel cross-sectional area and the discharge angle of the nozzle outlet of the TOBI nozzle 44 attached to the vanes 40, and the flow channel cross-sectional area and the discharge angle of the outlet of the disk hole 52 in the rotor disk 51 are also set such that an outlet absolute circumferential velocity vector of the disk hole 52 is smaller than an inlet absolute circumferential velocity vector of the disk hole 52. Thus, as illustrated in FIG. 2, the cooling air that passes through the TOBI nozzle 44 and once more changes its direction to the disk rotational direction U side, as illustrated by an arrow A3, is then caused to change its direction to the opposite side to the disk rotational direction U side in the course of passing through the disk hole 52, as illustrated by an arrow A4, and at this time, acts to assist drive the rotor disk 51 toward the disk rotational direction U. Specifically, the rotor disk 51 is also configured as a motive power recovery type disk.

Note that, it is sufficient that the outlet absolute circumferential velocity vector is smaller than the inlet absolute circumferential velocity vector, and the flow channel cross-sectional area and the discharge angle of the outlet of the disk hole 52 in the second stage rotor disk 51 may not be the same as the flow channel cross-sectional area and the discharge angle of the outlet of the disk hole 32 in the first stage rotor disk 31.

1-3 Effects

According to the gas turbine and the cooling structure for the turbine of the first embodiment of the present invention, as described above, the rotor disks 31 and 51 are configured as the motive power recovery type disks in which, for each of the disk holes 32 and 52, the outlet absolute circumferential velocity vector is set to be smaller than the inlet absolute circumferential velocity vector. As a result, in the course of passing through the disk holes 32 and 52, the cooling air works to assist drive the rotor disks 31 and 51 driven by the combustion gas G.

Further, in the present embodiment, the TOBI nozzles 24 and 44 are used and the narrowing thereof can cause the cooling air to accelerate on the disk rotational direction U side. As a result, the inlet absolute circumferential velocity vector of each of the disk holes 32 and 52 of the rotor disks 31 and 51 can be made larger. On the other hand, a discharge direction of the cooling air from the disk holes 32 and 52 is caused to be the opposite direction to the disk rotational direction U, and the outlet of each of the disk holes 32 and 52 is narrowed. As a result, the outlet absolute circumferential velocity vector, which is the component in the disk rotational direction U, can be made smaller. Thus, the difference between the inlet absolute circumferential velocity vector and the outlet absolute circumferential velocity vector (=inlet absolute circumferential velocity vector—outlet absolute circumferential velocity vector) can be significantly made larger, and a greater amount of motive power can be recovered from the cooling air.

Further, the TOBI nozzle 44 is also disposed between the first stage rotor disk 31 and the second stage rotor disk 51 (specifically, on the upstream side, in the flow direction of the cooling air, of the second stage rotor disk 51), and thus, the TOBI nozzle 44 can impart the circumferential velocity vector of the disk rotational direction U side to the cooling air that has the circumferential velocity vector in the opposite direction to the disk rotational direction U after passing through the disk hole 31. As a result, the inlet absolute circumferential velocity vector of the disk hole 52 in the second stage rotor disk 51 can be made larger, and thus, in addition to the first stage rotor disk 31, the second stage rotor disk 51 can also be the motive power recovery type disk, and the motive power can be recovered from the cooling air over a plurality of stages.

In addition, the disk holes 32 and 52 of the present embodiment have the airfoil shape that is curved smoothly to be oriented toward the opposite direction to the disk rotational direction U the closer to the outlet portion. As a result, the flow of the cooling air discharged toward the disk rotational direction U from the TOBI nozzles 24 and 44 can be efficiently recovered as the motive power that drives the rotor disks 31 and 51, and at the same time, the orientation of the cooling air is smoothly changed as it moves toward the outlet, thus pressure loss can be reduced.

Further, when the motive power is recovered from the cooling air, the cooling air works and the temperature thereof decreases. Thus, the load on the cooler 7 (see FIG. 1) can be reduced by an amount corresponding to this temperature decrease, and the motive power used to cool the cooling air can be reduced. In addition, since the temperature of the cooling air decreases, the extracted amount of the cooling air, namely the compressed air, can be reduced by an amount corresponding to the decrease in temperature. The amount of compressed air, which is the combustion air supplied to the combustor, can be increased by an amount corresponding to the reduction in the extracted amount of air, and thus, the combustion amount of the combustor can be increased and the turbine output can be improved.

1-4 Modified Example

Figure 4:
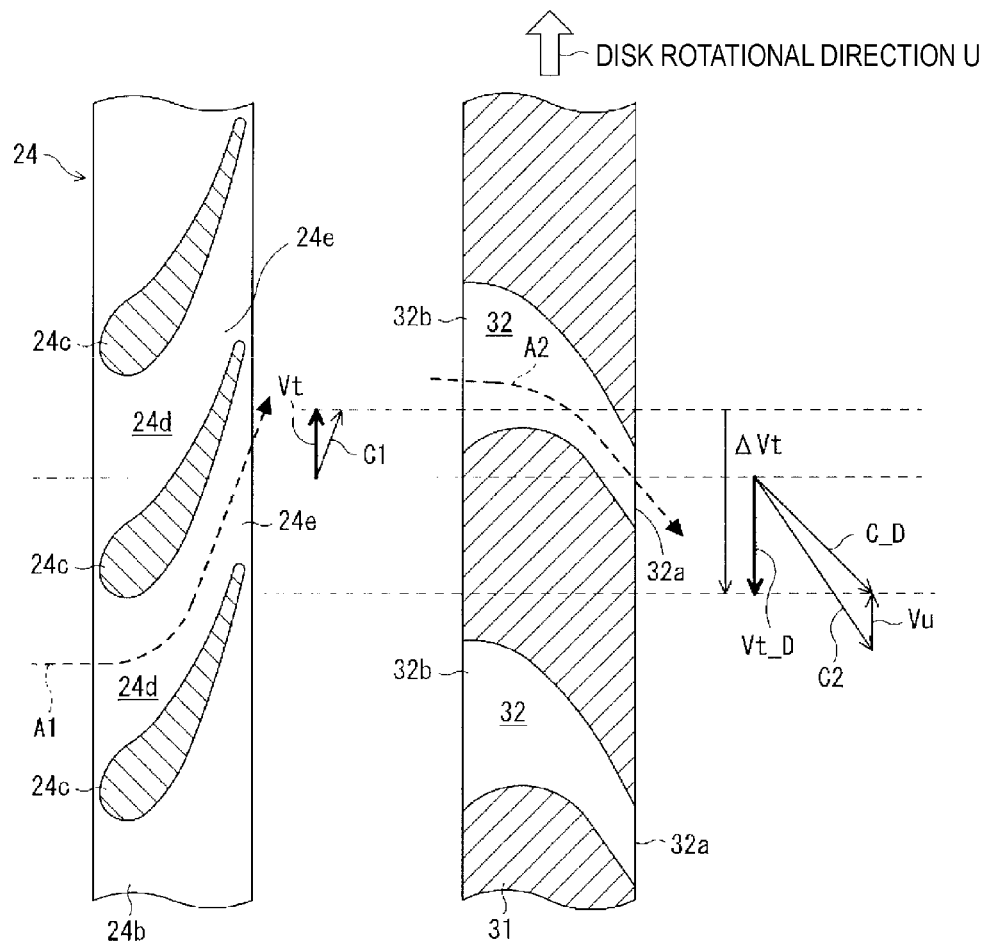
FIG. 4 is a schematic view illustrating the structure of the TOBI nozzle and the disk holes according to a modified example of the first embodiment of the present invention, and is a diagram in which the velocity vector of the cooling air and the rotational velocity vector of the rotor disk are illustrated in the cross-sectional view of the TOBI nozzle and the rotor disk cut along the circumferential direction.

The gas turbine and the cooling structure for the turbine of a modified example of the present embodiment are to be described with reference to FIG. 4. Note that the same elements as in the above-described embodiment are assigned the same reference signs, and a description thereof are omitted.

The cooling structure for the turbine of the present modified example is the same as the above-described embodiment, apart from the fact that the velocity vector C1 of the cooling air at the hole inlet 32b is set to be smaller and the circumferential velocity vector Vu of the rotor disk 31 is set to be smaller than in the above-described embodiment.

As a result, although the magnitude (absolute value) of the outlet absolute circumferential velocity vector Vt_D is larger than the magnitude (absolute value) of the inlet absolute circumferential velocity vector Vt, the direction of the outlet absolute circumferential velocity vector Vt_D is the opposite direction (the minus direction) to the disk rotational direction U, while the direction of the inlet absolute circumferential velocity vector Vt is the same direction (the plus direction) as the disk rotational direction U. Thus, when the disk rotational direction U is defined as the positive (plus) direction, and the direction opposite to the disk rotational direction U is defined as the negative (minus) direction, the outlet absolute circumferential velocity vector Vt_D is set to be smaller than the inlet absolute circumferential velocity vector Vt, and the rotor disk 31 is configured as the motive power recovery type disk in a similar manner to the above-described embodiment.

1-5 Other

Figure 2:
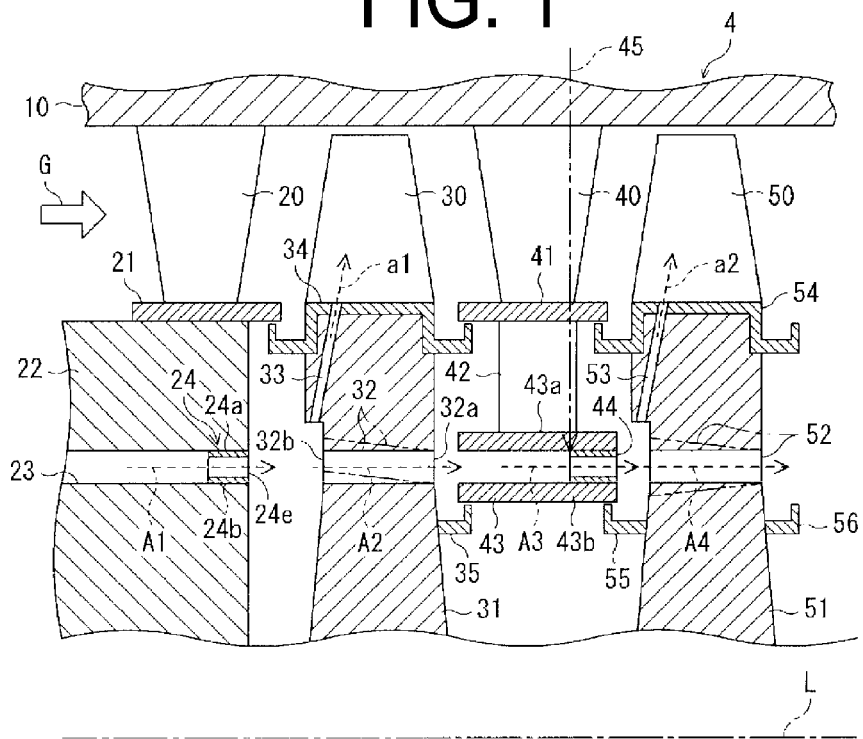
FIG. 2 is a schematic partial cross-sectional view of a turbine portion and a cooling structure of the turbine portion according to the first embodiment of the present invention.

In the above embodiment, the cooling air that has passed through the disk hole 32 of the preceding stage first stage rotor disk 31, is supplied to the TOBI nozzle 44 attached to the vanes 40, but as illustrated by a long dashed double-short dashed line in FIG. 2, the cooling air may be supplied from piping 45 that is inserted from outside the casing 10 into the interior of the vane 40.

2 Second Embodiment

The gas turbine and the cooling structure for the turbine of a second embodiment of the present invention are to be described with reference to FIGS. 1, 2, and 5. Note that the same elements as in the first embodiment are assigned the same reference signs, and a description thereof are omitted.

2-1 Configuration of Turbine Portion and Cooling Structure Thereof

Figure 5:
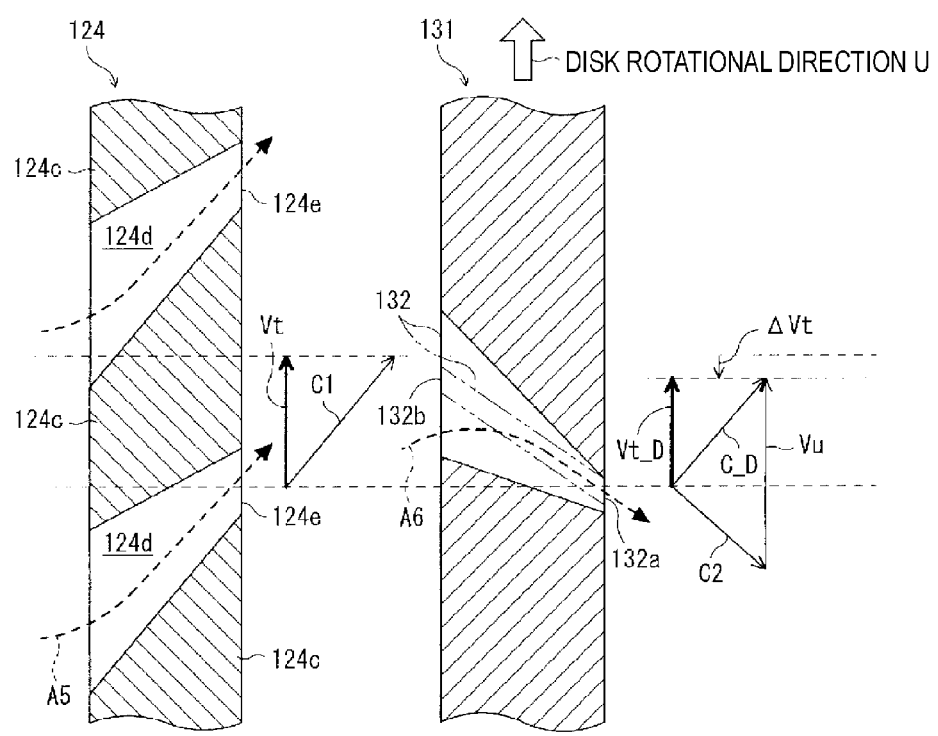
FIG. 5 is a schematic view illustrating the structure of a TOBI nozzle and disk holes according to the second embodiment of the present invention, and is a diagram in which the velocity vector of the cooling air and the rotational velocity vector of a rotor disk are illustrated in a cross-sectional view of the TOBI nozzle and the rotor disk cut along the circumferential direction.

With respect to the configuration of the first embodiment illustrated in FIGS. 2 and 3, the turbine portion 4 of the present embodiment (see FIG. 1) and the cooling structure thereof use a TOBI nozzle 124 and a rotor disk 131 illustrated in FIG. 5 in place of the TOBI nozzles 24 and 44, and the rotor disks 31 and 51, respectively.

The TOBI nozzle 124 is provided with a plurality of columnar members 124c arranged at equal intervals in the circumferential direction and disposed between an outer ring portion and an inner ring portion, and nozzle portions 124d are formed between the columnar members 124c adjacent to each other in the circumferential direction. As illustrated in FIG. 5, a cross-sectional shape of each of the nozzle portions 124d, when cut along the circumferential direction, is a tapered trapezoid shape that inclines to the disk rotational direction U side, in a flow direction A5 of the cooling air, and this cross-sectional shape has a constant cross-sectional shape with respect to the radial direction (the vertical direction on the paper surface in FIG. 5). Specifically, in a cross section cut along the circumferential direction, walls defining each of the nozzle portions 124d are formed as straight lines, and the nozzle portions 124d are formed as a narrowing shape whose flow channel cross-sectional area becomes smaller the further to the downstream side in the above-described flow direction A5.

Since, with respect to the rotor disk 31 of the first embodiment, the rotor disk 131 differs only in that the shape of disk holes 132 thereof is different, only the disk holes 132 are to be described.

As illustrated in FIG. 5, a cross-sectional shape of each of the disk holes 132, when cut along the circumferential direction, is a tapered trapezoid shape that inclines in the opposite direction to the disk rotational direction U side, in a flow direction A6 of the cooling air, and this cross-sectional shape has a constant cross-sectional shape with respect to the radial direction. Specifically, in a cross section cut along the circumferential direction, walls defining each of the disk holes 132 are formed as straight lines, and the disk holes 132 are formed in a narrowing shape whose flow channel cross-sectional area becomes smaller the further to the downstream side in the above-described flow direction A6.

Further, the flow channel cross-sectional area and the discharge angle at the nozzle outlet 124e, and the flow channel cross-sectional area and the discharge angle at a hole outlet 132a are set such that the absolute circumferential velocity vector Vt_D of the cooling air at the hole outlet 132a is smaller than the absolute circumferential velocity vector Vt of the cooling air at a hole inlet 132b (the absolute circumferential velocity vector of the cooling air at the nozzle outlet 124e). Specifically, the rotor disk 131 is configured as the motive power recovery type disk.

Note that the flow channel cross-sectional area and the discharge angle of the outlets of the disk holes in the first stage rotor disk may not be the same as the flow channel cross-sectional area and the discharge angle of the outlets of disk holes in a second stage rotor disk.

2-2 Effects

Since the gas turbine and the cooling structure thereof according to the second embodiment of the present invention are configured in the manner described above, in addition to obtaining the same effects as the first embodiment, because the nozzle portion 124d and the disk hole 132 have the shape in which the walls defining the nozzle portions 124d and the disk holes 132 are straight lines in a cross section cut along the circumferential direction, machining to form the nozzle portions 124d and the disk holes 132 becomes simpler, manufacturing costs can be reduced and a manufacturing period can be shortened.

2-3 Other

In the above-described second embodiment, the disk hole 132 has the narrowing shape in which the flow channel cross-sectional area decreases the closer to the hole outlet 132a side, but the disk hole 132 may have a shape in which the flow channel cross-sectional area is constant with respect to the flow direction of the cooling air, as illustrated by long dashed double-short dashed lines in FIG. 5, as long as the outlet absolute circumferential velocity vector Vt_D at the hole outlet 132a is set to be smaller than the inlet absolute circumferential velocity vector Vt of the cooling air at the hole inlet 132b. In this case, the machining to form the disk holes 132 becomes even simpler.

Figure 6:
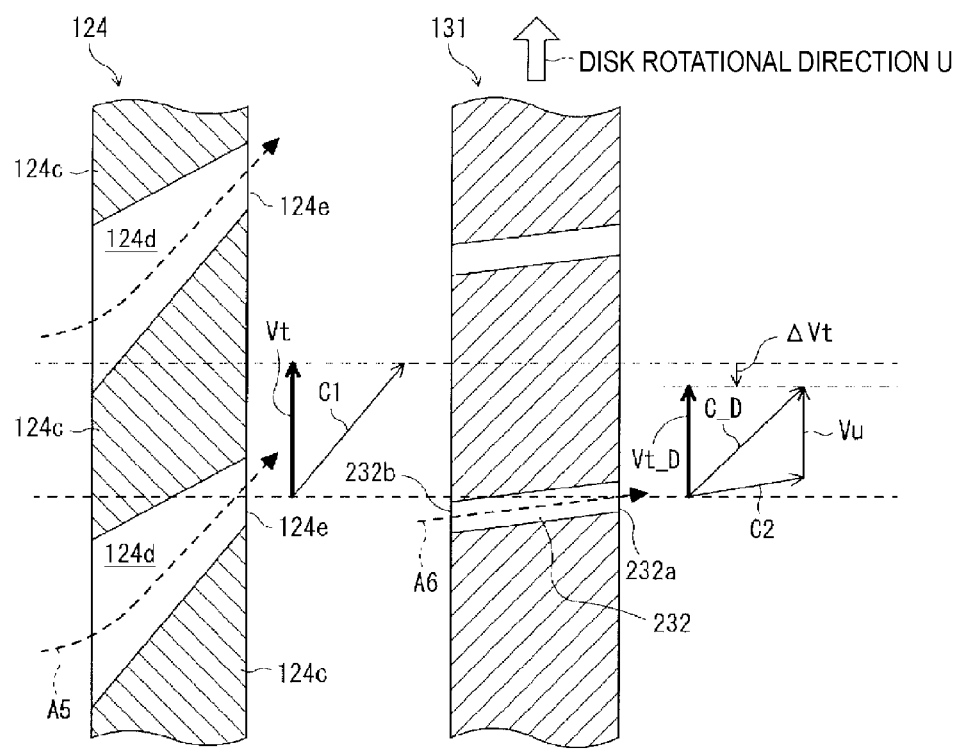
FIG. 6 is a schematic view illustrating the structure of the TOBI nozzle and the disk holes according to a modified example of the second embodiment of the present invention, and is a diagram in which the velocity vector of the cooling air and the rotational velocity vector of the rotor disk are illustrated in the cross-sectional view of the TOBI nozzle and the rotor disk cut along the circumferential direction.

In addition, in the above-described second embodiment, the disk holes 132 are configured to incline in the direction opposite to the disk rotational direction U toward the flow direction A6 of the cooling air, but in place of the disk holes 132 inclined in this manner, disk holes 232 that incline to the disk rotational direction U side toward the downstream side of the flow direction A6 of the cooling air may be adopted, as illustrated in FIG. 6. When the disk rotation speed relatively slow, even with the disk holes inclined in this manner, the outlet absolute circumferential velocity vector Vt_D can be made smaller than the inlet absolute circumferential velocity vector Vt of the cooling air. Note that, when the disk holes are caused to incline to the disk rotational direction U side in this manner, if a hole outlet 232a is narrowed, the outlet absolute circumferential velocity vector Vt_D becomes larger, and thus, although the disk hole 232 here has the narrowing shape as illustrated in FIG. 6, the disk hole 232 may have a shape in which the flow channel cross-sectional area thereof is caused to expand from a hole inlet 232b toward the hole outlet 232a.

3 Third Embodiment

The gas turbine and the cooling structure for the turbine according to a third embodiment of the present invention are to be described with reference to FIGS. 1, 7, and 8. Note that the same elements as in the above-described embodiments are assigned the same reference signs, and a description thereof are omitted. Note that FIG. 8 is a schematic cross-sectional view of the TOBI nozzle 24, a first stage rotor disk 331, and a second stage rotor disk 351 cut along the circumferential direction (note that only a part thereof is illustrated), and velocity vectors of the cooling air and of the rotor disks 331 and 351 are illustrated in the diagram.

3-1 Configuration of Turbine Portion and Cooling Structure Thereof

Figure 7:
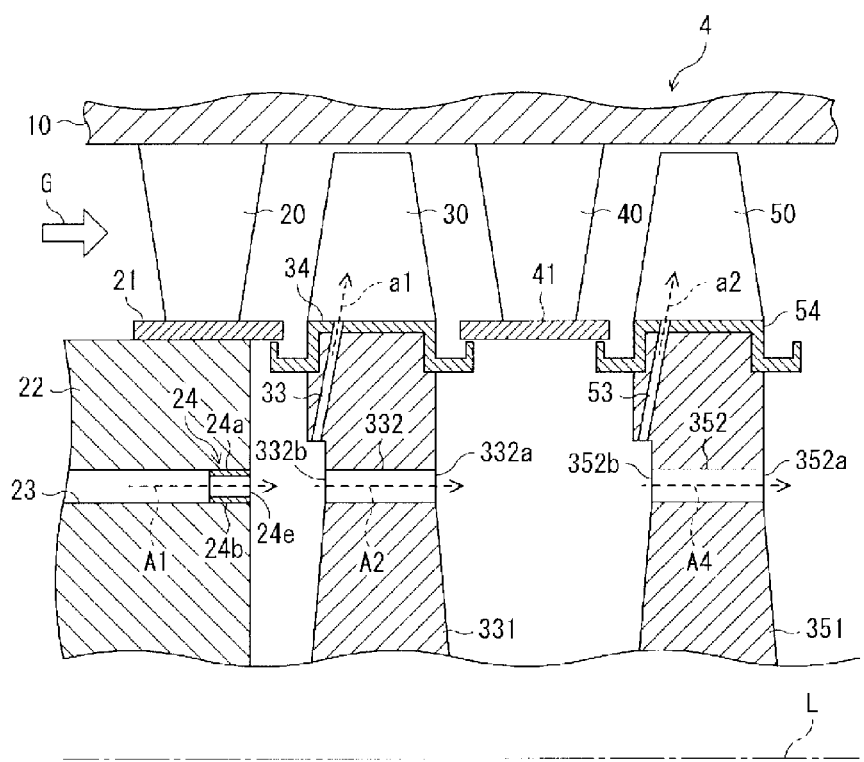
FIG. 7 is a schematic partial cross-sectional view of a turbine and a cooling structure of the turbine according to the third embodiment of the present invention.
Figure 8:
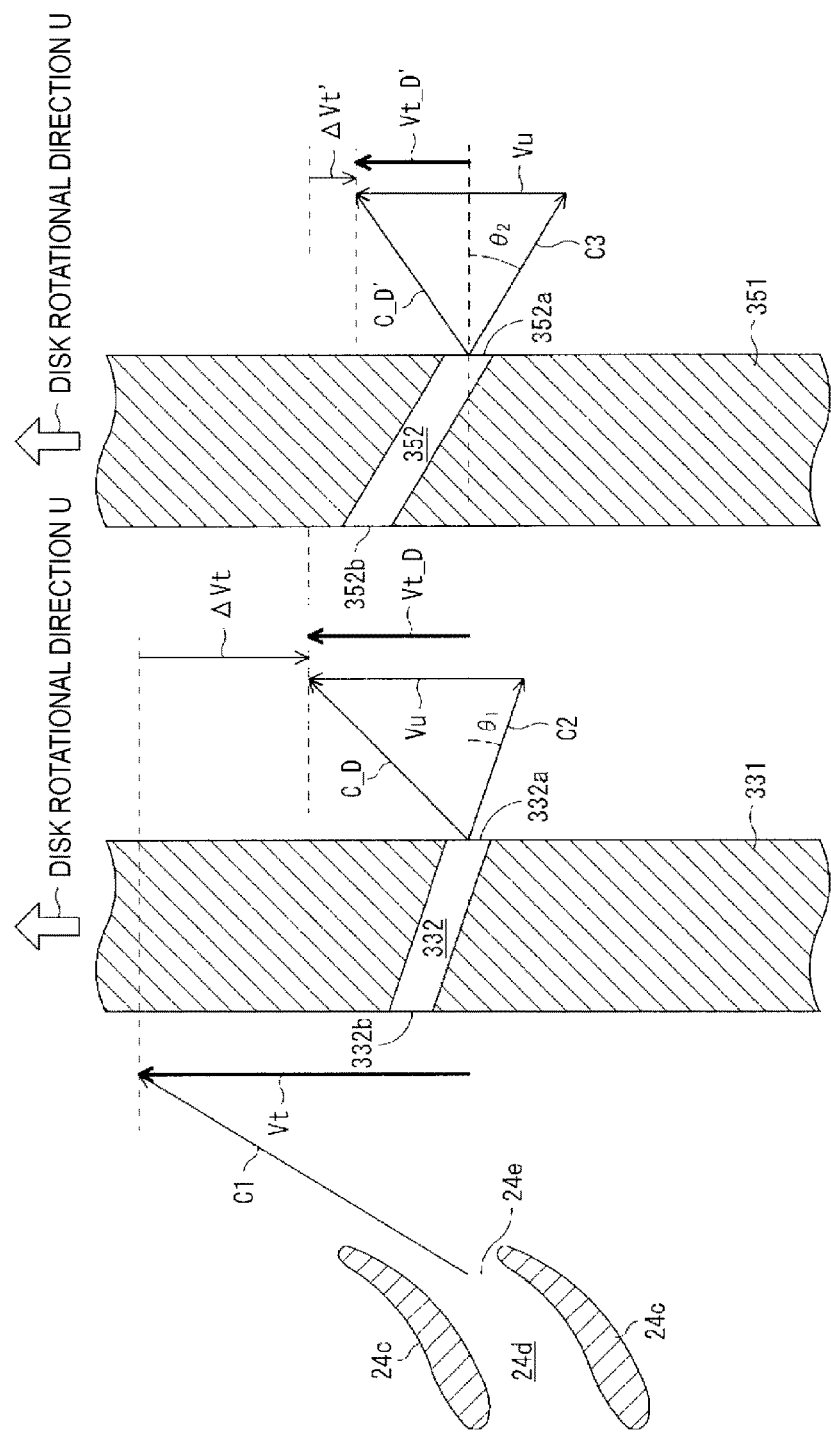
FIG. 8 is a schematic view illustrating the structure of the TOBI nozzle and the disk holes according to the third embodiment of the present invention, and is a diagram in which the velocity vector of the cooling air and rotational velocity vectors of rotor disks are illustrated in a cross-sectional view of the TOBI nozzle and the rotor disks cut along the circumferential direction.

The turbine portion 4 (see FIG. 1) and the cooling structure thereof of the present embodiment are configured as illustrated in FIG. 7. In contrast to the first embodiment illustrated in FIG. 2, this cooling structure differs in that, the TOBI nozzle 44 (more specifically, further, the members 42 and 43 for attaching the TOBI nozzle 44, and the seal members 35, 55, and 56) are not provided on the vanes 40 disposed between the blades 30 and 50, and a configuration of the first stage rotor disk 331 and the second stage rotor disk 351 (more specifically, a configuration of disk holes in each of the disks 331 and 351) is different.

Hereinafter, the first stage rotor disk 331 and the second stage rotor disk 351 are to be described.

Disk holes 332 are provided in the first stage rotor disk 331. The disk holes 332 are formed to penetrate through the first stage rotor disk 331 in the direction of the rotational axis L, and are disposed in a plurality at equal intervals in the circumferential direction, at the same position in the radial direction. Further, for each of the disk holes 332, a flow channel cross section (a cross section cut vertically with respect to the flow direction A2 of the cooling air) is a constant shape with respect to the flow direction A2 of the cooling air (for example, a square shape, a rectangular shape, a circular shape, an elliptical shape and the like).

Similarly, disk holes 352 are provided in the second stage rotor disk 351. The disk holes 352 are formed to penetrate through the second stage rotor disk 351 in the direction of the rotational axis L, and are disposed in a plurality at equal intervals in the circumferential direction, at the same position in the radial direction. Further, for each of the disk holes 352, a flow channel cross section is a constant shape with respect to the flow direction A4 of the cooling air (for example, a square shape, a rectangular shape, a circular shape, an elliptical shape and the like).

As illustrated in FIG. 7, each of the disk holes 332 and each of the disk holes 352 is disposed at the same position as the TOBI nozzle 24 in the radial direction, a number of each is the same, and the flow channel cross-sectional area of a hole outlet 332a and a hole outlet 352a is set to be the same. Further, a cross-sectional shape in the circumferential direction of the disk holes 332 and 352 may be constant in the radial direction (the vertical direction on the paper surface in FIG. 8), or may not be constant.

Note that the plurality of disk holes 332 may not be disposed in the same position in the radial direction, may not be disposed at equal intervals, and further, may not be disposed at the same position as the TOBI nozzle 24 in the radial direction. Similarly, the plurality of disk holes 352 may not be disposed in the same position in the radial direction, may not be disposed at equal intervals, and further, may not be disposed at the same position as the TOBI nozzle 24 in the radial direction. In addition, the number of the disk holes 332 may be different from the number of the disk holes 352, and the flow channel cross-sectional shape and the flow channel cross-sectional area of the disk hole 332 may be different from those of the disk hole 352. Furthermore, the respective flow channel cross-sectional shapes of the disk holes 332 and 352 may not be the constant cross-sectional shape with respect to the flow direction.

As illustrated in FIG. 8, the flow channel cross-sectional area and the discharge angle at the nozzle outlet 24e, and the flow channel cross-sectional area and the discharge angle at the hole outlet 332a of each of the disk holes 332 in the first stage rotor disk 331 are set such that the absolute circumferential velocity vector Vt_D of the cooling air at the hole outlet 332a is smaller than the absolute circumferential velocity vector Vt of the cooling air at a hole inlet 332b (specifically, the absolute circumferential velocity vector of the cooling air at the nozzle outlet 24e of the TOBI nozzle 24). Specifically, the rotor disk 131 is configured as the motive power recovery type disk.

In addition, a feature of the present embodiment is that each of the disk holes 352 of the second stage rotor disk 351 is configured to discharge the cooling air to be inclined even further to the opposite side to the disk rotational direction U than the disk holes 332 of the first stage rotor disk 331.

In other words, an inclination angle θ2 toward the downstream side in the flow direction of the cooling air of each of the disk holes 352 is set to incline in a direction opposite to the disk rotational direction U such that the inclination angle θ2 is larger than a same inclination angle θ1 of the disk hole 331.

As a result, as illustrated in FIG. 8, the motive power can be recovered from the cooling air at the later stage disk holes 352 as well.

Specifically, by discharging, from the later stage disk holes 352, the cooling air that is more significantly inclined to the opposite side to the disk rotational direction U than the cooling air from the preceding stage disk holes 332, when the disk rotational direction U is defined as the positive direction and the direction opposite to the disk rotational direction U is defined as the negative direction, an outlet absolute circumferential velocity vector Vt_D' that is a circumferential velocity component of an absolute velocity vector C_D' of the cooling air at the hole outlet 352a (a velocity vector obtained by combining a velocity vector C3 of the cooling air and the disk circumferential velocity vector Vu) is smaller, by ΔVt', than the outlet absolute circumferential velocity vector Vt_D of the cooling air at the preceding stage hole outlet 332a (specifically, the inlet absolute circumferential velocity vector Vt_D at the hole inlet 352b). As a result, the motive power can be recovered from the cooling air at the later stage disk holes 352 as well. Specifically, in addition to the preceding stage rotor disk 331, the later stage rotor disk 351 is also configured as the motive power recovery type disk.

Note that, here, the example is given in which the flow channel cross-sectional area at the hole outlet of each of the disk holes 332 and the disk holes 352 is the same, and the number of the disk holes 332 and of the disk holes 352 is the same, but, as described above, the flow channel cross-sectional area at the hole outlet, and the number of the disk holes 332 and the disk holes 352 may be different from each other. In this case also, it goes without saying that by discharging, from the later stage disk holes 352, the cooling air that is more significantly inclined to the opposite side to the disk rotational direction U than the cooling air from the preceding stage disk holes 332, the outlet absolute circumferential velocity vector Vt_D' of the disk hole 352 can be made smaller.

Here, similar to the inlet absolute circumferential velocity vector Vt and the outlet absolute circumferential velocity vector Vt_D, the outlet absolute circumferential velocity vector Vt_D' is a velocity vector of an absolute system that takes a fixed system as reference, and the fact that the outlet absolute circumferential velocity vector Vt_D' is smaller than the inlet absolute circumferential velocity vector) Vt_D means a comparison of vector quantities when the disk rotational direction U is defined as the positive (plus) direction, and the direction opposite to the disk rotational direction U is defined as the negative (minus) direction.

3-2 Effects

According to the gas turbine and the cooling structure thereof according to the third embodiment of the present invention, the later stage rotor disk 351 is also configured as the motive power recovery type disk, and thus, the improvement in the output of the gas turbine and the lowering of the temperature of the cooling air as a result of the motive power recovery can be even more effectively realized.

3-3 Other

In the above-described third embodiment, each of the flow channel cross-sectional shapes of the disk holes 332 and 352 is the constant shape with respect to the flow direction of the cooling air, but the narrowing shape disk holes, such as those of the first embodiment (see FIG. 3) or the second embodiment (see FIG. 5) may be used as the disk holes 332 and 352.

4 Fourth Embodiment

The gas turbine and the cooling structure for the turbine of a fourth embodiment of the present invention are to be described with reference to FIGS. 1, 9 and 10. Note that the same elements as the above-described embodiment are assigned the same reference signs, and a description thereof are omitted. Note that FIG. 10 is a schematic cross-sectional view of the TOBI nozzle 24, the first stage rotor disk 331 and a second stage rotor disk 451 cut along the circumferential direction (note that only a part thereof is illustrated), and velocity vectors of the cooling air and of the rotor disks 331 and 451 are illustrated in the diagram.

4-1 Configuration of Turbine and Cooling Structure Thereof

Figure 9:
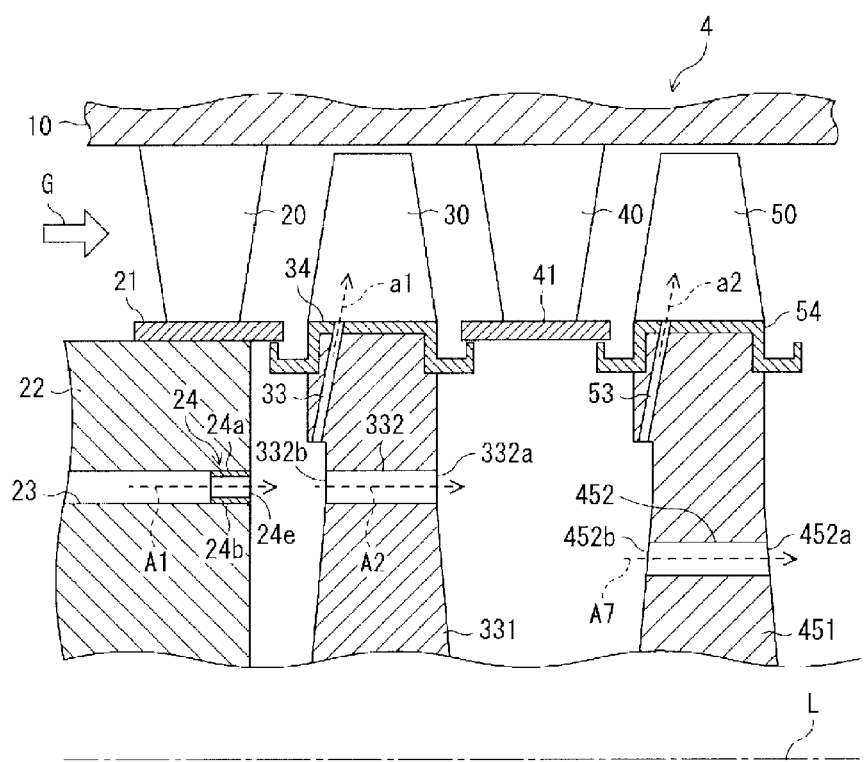
FIG. 9 is a schematic partial cross-sectional view of the turbine portion and a cooling structure of the turbine portion according to the fourth embodiment of the present invention.
Figure 10:
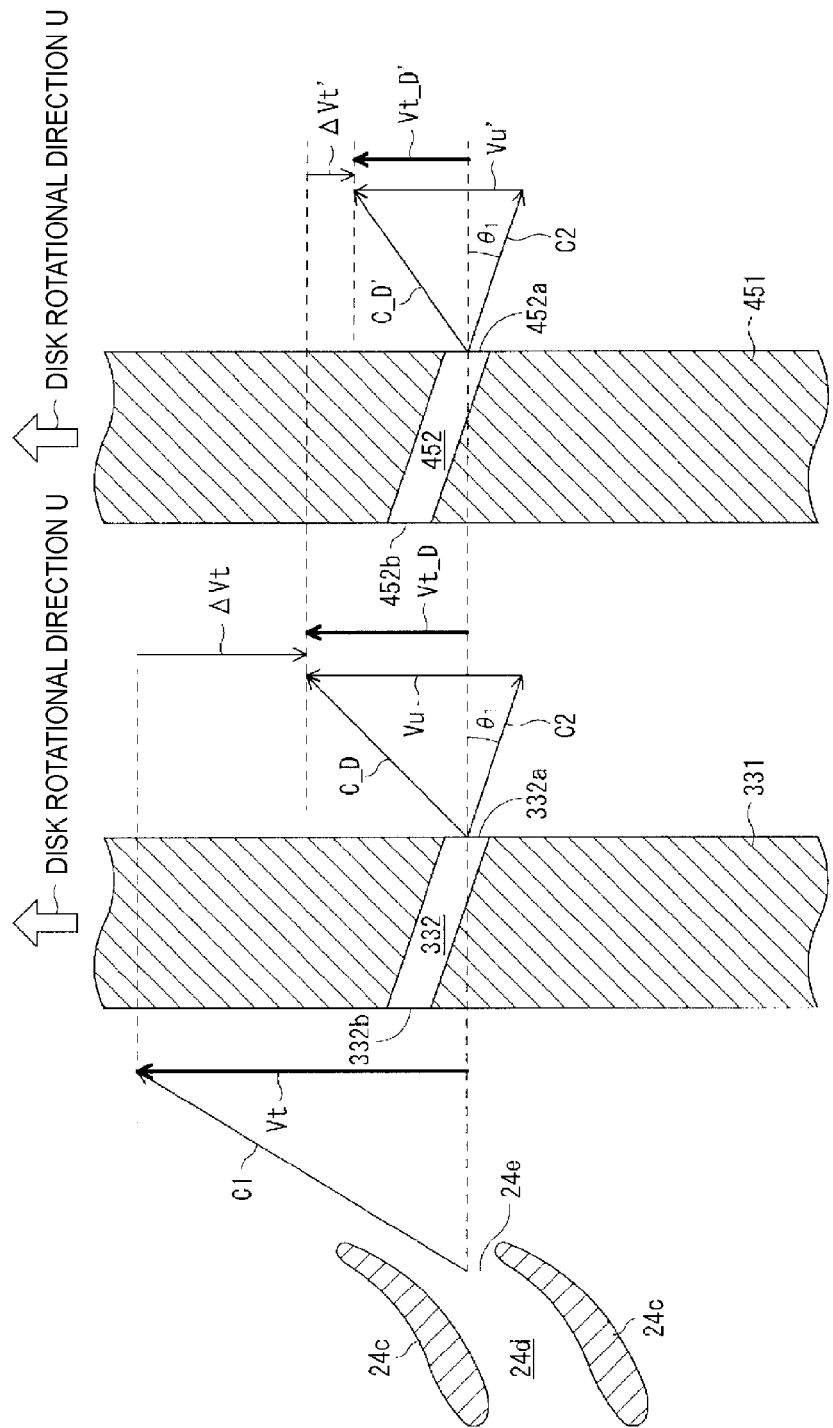
FIG. 10 is a schematic view illustrating the structure of the TOBI nozzle and disk holes according to the fourth embodiment of the present invention, and is a diagram in which a velocity vector of cooling air and rotational velocity vectors of rotor disks are illustrated in a cross-sectional view of the TOBI nozzle and the rotor disks cut along the circumferential direction.

The turbine portion 4 (see FIG. 1) of the present embodiment and the cooling structure thereof are configured as illustrated in FIGS. 9 and 10, and the configuration of the second stage rotor disk (more specifically, the arrangement of the disk holes) is different with respect to the configuration of the third embodiment illustrated in FIGS. 7 and 8.

Hereinafter, the second stage rotor disk 451 is to be described.

Disk holes 452 are disposed in the second stage rotor disk 451 in a plurality at equal intervals in the circumferential direction, at the same position in the radial direction. Each of the disk holes 452 are formed to penetrate through the second stage rotor disk 451 in the direction of rotational axis L.

Further, each of the disk holes 452 is configured to have the same shape and be provided in the same number as the disk holes 332 of the first stage rotor disk 331, and the inclination angle (discharge angle) θ1 thereof, the number thereof, and the flow channel cross-sectional area of a hole outlet 452a thereof are the same as those of the disk holes 332. However, as illustrated in FIG. 9, each of the disk holes 452 is disposed in a position (an inner circumferential side) that is closer to the rotational axis L than each of the disk holes 332, and a radius of gyration thereof is set to be small. Note that it is sufficient that the plurality of disk holes 452 be disposed further to the inner circumferential side than the disk holes 332, and they may not be disposed in the same position in the radial direction, and may not be disposed at equal intervals. Further, the shape of each of the disk holes 452 (the inclination angle, the flow channel cross-sectional area of the hole outlet 452a and the like), and a number of the disk holes 452 may not be the same as those of the disk holes 332.

In this way, as illustrated in FIG. 10, by disposing the disk holes 452 further to the inner circumferential side than the disk holes 332, the motive power can be recovered from the cooling air at the later stage disk holes 452 as well.

Specifically, since the radius of gyration of each of the disk 452 is set to be small, a disk circumferential velocity vector Vu' at the position in the radial direction of the disk holes 452 is smaller than the disk circumferential velocity vector Vu at the position in the radial direction of the disk holes 332. Corresponding to an amount by which the disk circumferential velocity vector Vu' becomes smaller, the outlet absolute circumferential velocity vector Vt_D', which is a circumferential velocity component of an absolute velocity vector C_D' of the cooling air at the hole outlet 452a (a velocity vector obtained by combining the velocity vector C2 and the disk circumferential velocity vector Vu') is made smaller, by ΔVt', than the outlet absolute circumferential velocity vector Vt_D of the cooling air at the preceding stage hole outlet 332a (specifically, the inlet absolute circumferential velocity vector of the cooling air at a hole inlet 452b), and the motive power is recovered from the cooling air.

Specifically, in addition to the preceding stage rotor disk 331, the later stage rotor disk 451 is also configured as the motive power recovery type disk.

Note that, here, the example is given in which the inclination angle, the flow channel cross-sectional area of the hole outlet of each of the disk holes 332 and the disk holes 452, and the number of the disk holes 332 and of the disk holes 452 are the same, but as described above, the inclination angle, the flow channel cross-sectional area of the hole outlet, and the number of the disk holes 332 may differ from those of the disk holes 452. In this case also, it goes without saying that, by disposing the later stage disk holes 452 further to the inner circumferential side than the disk holes 332, the outlet absolute circumferential velocity vector Vt_D' of the disk holes 452 can be made smaller.

4-2 Effects

According to the gas turbine and the cooling structure for the turbine of the fourth embodiment of the present invention, the later stage rotor disk 451 is also configured as the motive power recovery type disk in a similar manner to the third embodiment, and thus the improvement in the output of the gas turbine and the lowering of the temperature of the cooling air as a result of the motive power recovery can be even more effectively realized.

4-3 Other

In the above-described fourth embodiment, the disk holes 332 on the outer circumferential side and the disk holes 452 on the inner circumferential side have the same shape, but they may have different shapes. For example, the disk holes 452 on the inner circumferential side may be caused to discharge the cooling air further toward the opposite side to the disk rotational direction U than the disk holes 332, as with the disk holes 352 (see FIG. 8) of the above-described third embodiment. In this manner, the outlet absolute circumferential velocity vector Vt_D' of the cooling air at the disk hole 452 can be made even smaller, and even more motive power can be recovered from the cooling air.

5 Other (1) In each of the above-described embodiments, the rotor disk is configured as the motive power recovery type disk, but the adoption of the motive power recovery type disk is not limited to the rotor disk. For example, when a seal disk is provided that rotates integrally with this rotor disk at the preceding stage to the rotor disk (specifically, rotates integrally with the blades), disk holes of the seal disk may adopt the configuration of the disk holes of the rotor disks described above in each of the embodiments and the modified examples thereof (the configuration of the disk holes having the narrowing shape as in the first embodiment and the second embodiment, for example), and may be set such that an outlet absolute circumferential velocity vector of the cooling air is smaller than an inlet absolute circumferential velocity vector of the cooling air. In this way, the seal disk can also be configured as the motive power recovery type disk.

(2) In each of the above-described embodiments, the TOBI nozzle 24 is provided in the stage preceding the first stage rotor disk, and the cooling air is supplied to the first stage rotor disk from the cavity inside the shell portion 22 by the TOBI nozzle 24, as the circulating flow. However, a configuration is possible in which the cooling air is supplied from the cavity to the first stage rotor disk without providing the TOBI nozzle 24 (without creating the circulating flow).

(3) In each of the above-described embodiments, as illustrated in FIG. 3, the airfoil type nozzle is used as the TOBI nozzle, in which the plurality of airfoil portions 24c are arranged side by side in the circumferential direction and the nozzle portions 24d are formed between each of the airfoil portions 24c. However, in place of the airfoil type nozzle, a pipe-shaped nozzle type may be used, in which a plurality of pipe-shaped nozzles arranged in the circumferential direction cause the circulating flow of the cooling air and supply the cooling air.

(4) In the above-described first embodiment, as illustrated in FIG. 2, the TOBI nozzle 44 provided between the rotor disks 31 and 51 is supported by the vanes 40, but a TOBI nozzle provided between rotor disks may not be supported by vanes, and, for example, the TOBI nozzle may be configured as the pipe-shaped nozzle type and the pipe-shaped nozzle may be supported by the casing 10.

(5) A method for setting the outlet absolute circumferential velocity to be slower than the inlet absolute circumferential velocity at the disk hole is not limited to the setting methods described in each of the above-described embodiments.

For example, with respect to the above-described first and second embodiments, the methods used in each of the above-described embodiments may be combined as appropriate, such as making the radius of gyration of the disk hole a smaller radius than that of the TOBI nozzle by disposing the disk hole further to the rotational axis L side than the TOBI nozzle, or the like.

Further, with respect to the above-described third embodiment as illustrated in FIG. 8, instead of setting the inclination angles of the preceding stage disk holes 332 and the later stage disk holes 352 to be different angles, the following may be adopted.

Specifically, the outlet absolute circumferential velocity vector Vt_D' may be made smaller by providing a narrowing of the outlet of the later stage disk hole 352 and making the velocity vector of the cooling air thereof larger.

(6) In each of the above-described embodiments, the cross-sectional shape of the nozzle portion and the disk hole when cut along the circumferential direction is constant with respect to the radial direction, but the present invention is not limited to this example, and the cross-sectional shape thereof along the radial direction may be a cross-sectional shape that is not constant in the radial direction, such as a circular shape (a circular hole) or an elliptical shape (a tapered hole). Furthermore, as with the disk holes 32 and 52 indicated by the long dashed double-short dashed lines in FIG. 2, the disk holes may be configured to be inclined in the radial direction such that the inlet and the outlet thereof have a different position in the radial direction, or may have a shape that narrows in the radial direction, while the cross-sectional shape along the circumferential direction is kept constant with respect to the radial direction (or the cross-sectional shape along the circumferential direction changes with respect to the radial direction). In addition, the positions in the radial direction of the disk holes and the TOBI nozzle may be different positions, within a range over which the motive power recovery by the disk holes is possible.

(7) In each of the above-described embodiments, each of the disk holes is the same as each other within the disk including the disk holes, and the shape (the inclination angle and the flow channel cross-sectional area) thereof and the position in the radial direction are the same, but the present invention is not limited to this example, and some of the disk holes may be caused to have a different shape or a different position in the radial direction.

(8) In each of the above-described embodiments, the outlet absolute circumferential velocity vector is set to be smaller than the inlet absolute circumferential velocity vector of the cooling air for each of the plurality of disk holes provided in the rotor disk, but it is sufficient that the outlet absolute circumferential velocity vector is set to be smaller than the inlet absolute circumferential velocity vector of the cooling air for at least one disk hole among the plurality of disk holes provided in the rotor disk. Further, it is sufficient that, among the plurality of disks, at least one of the rotor disk, the seal disk, or the like is configured to be the motive power recovery type disk.

(9) In each of the above-described embodiments, the example is given in which the gas turbine of the present invention is applied to a power generation gas turbine. However, the gas turbine of the present invention is not limited to being applied to the power generation gas turbine, and can be applied to a gas turbine for aviation, for example.

REFERENCE SIGNS LIST

1 Gas turbine
2 Compressor (compressor portion)
3 Combustor (combustion portion)
4 Turbine portion (turbine)
5 Rotating shaft
20, 40 Vane
24, 44, 124 TOBI nozzle
30, 50 Blade
31, 51, 131, 331, 351, 451 Rotor disk (motive power recovery type disk)
32, 52, 132, 232, 332, 352, 452 Disk hole
32a, 52a, 132a, 232a, 332a, 352a, 452a Hole outlet
32b, 52b, 132b, 232b, 332b, 352b, 452b Hole inlet
C1, C2, C3 Velocity vector of cooling air
L Rotational axis
U Disk rotational direction
Vt, Vt_D, Vt_D' Absolute circumferential velocity vector
θ1,θ2 Disk hole inclination angle (discharge angle)

The invention claimed is:

1. A cooling structure for a turbine, the cooling structure comprising:
    disks configured to rotate integrally with blades about a rotational axis in a rotational direction, the disks being disposed in a plurality of stages along the rotational axis; and
    disk holes defined in the disks along a circumferential direction, the disk holes being configured to supply cooling air to the disks on a downstream side so as to cool the blades,
    wherein:
    at least one of the disks, from among the disks from a second of the disks onward from an upstream side in a flow direction of the cooling air, is configured as a motive power recovery disk in which at least one of the disk holes is set such that an outlet absolute circumferential velocity vector, which is a component in the rotational direction of a velocity vector of the cooling air at an outlet of the at least one of the disk holes, is smaller than an inlet absolute circumferential velocity vector, which is a component in the rotational direction of a velocity vector of the cooling air at an inlet of the at least one of the disk holes;
    the rotational direction of the motive power recovery disk is defined as a positive direction and a direction opposite the rotational direction of the motive power recovery disk is defined as a negative direction; and
    the cooling air is configured to be supplied to the motive power recovery disk from one of the disks disposed further to the upstream side in the flow direction of the cooling air than the motive power recovery disk.

2. The cooling structure according to claim 1,
wherein the outlet of the at least one of the disk holes of the motive power recovery disk is disposed further to the upstream side, in the rotational direction, than the inlet of the at least one of the disk holes of the motive power recovery disk.

3. The cooling structure according to claim 2,
wherein, in a cross section cut along the circumferential direction, the at least one of the disk holes of the motive power recovery disk has an airfoil shape that curves in the direction opposite the rotational direction of the motive power recovery disk toward the downstream side in the flow direction of the cooling air.

4. The cooling structure according to claim 2,
wherein the at least one of the disk holes of the motive power recovery disk is narrowed on the downstream side in the flow direction of the cooling air.

5. The cooling structure according to claim 1,
wherein, in a cross section cut along the circumferential direction, wall surfaces defining the at least one of the disk holes of the motive power recovery disk are straight lines.

6. The cooling structure according to claim 1, further comprising:
a TOBI nozzle configured to form a circulating flow of the cooling air rotating in the same direction as the rotational direction of the motive power recovery disk, the cooling air being supplied from the TOBI nozzle to the motive power recovery disk.

7. The cooling structure according to claim 6,
wherein the TOBI nozzle is in at least one of spaces between the disks.

8. The cooling structure according to claim 1, wherein:
an inclination angle of the at least one of the disk holes of the motive power recovery disk and an inclination angle of the disk hole of the one of the disks disposed further to the upstream side in the flow direction of the cooling air than the motive power recovery are different angles such that the outlet absolute circumferential velocity vector is smaller than the inlet absolute circumferential velocity vector in the motive power recovery disk.

9. The cooling structure according to claim 1, wherein:
a distance from the rotational axis to the at least one of the disk holes of the motive power recovery disk is different than a distance from the rotational axis to the disk hole of the one of the disks disposed further to the upstream side in the flow direction of the cooling air than the motive power recovery disk such that the outlet absolute circumferential velocity vector is smaller than the inlet absolute circumferential velocity vector in the motive power recovery disk.

10. A gas turbine comprising:
a compressor portion configured to take in and compress air; a combustion portion configured to generate combustion gas by combusting a fuel-air mixture of compressed air and a fuel supplied from outside; and a turbine portion configured to extract a rotational driving force from the combustion gas generated by the combustion portion, the turbine portion including the cooling structure according to claim 1.

* * * * *